US011652947B1

(12) United States Patent
Tanaka

(10) Patent No.: US 11,652,947 B1
(45) Date of Patent: May 16, 2023

(54) INFORMATION PROCESSING APPARATUS THAT DELETES USER REGISTRATION AND FUNCTION INFORMATION, ACCORDING TO RULE RELATED TO EVENT THAT HAS OCCURRED

(71) Applicant: KYOCERA Document Solutions Inc., Osaka (JP)

(72) Inventor: Chigusa Tanaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/993,929

(22) Filed: Nov. 24, 2022

(30) Foreign Application Priority Data

Nov. 25, 2021 (JP) .............................. JP2021-191345

(51) Int. Cl.
  *H04N 1/21* (2006.01)
  *G06F 3/12* (2006.01)
  *H04N 1/44* (2006.01)

(52) U.S. Cl.
  CPC ......... *H04N 1/2179* (2013.01); *G06F 3/1203* (2013.01); *G06F 3/1238* (2013.01); *G06F 3/1239* (2013.01); *H04N 1/4406* (2013.01); *H04N 1/4413* (2013.01); *H04N 1/4433* (2013.01); *H04N 2201/218* (2013.01)

(58) Field of Classification Search
  None
  See application file for complete search history.

(56) References Cited

U.S. PATENT DOCUMENTS

| 8,266,675 | B2* | 9/2012 | Murakawa | H04L 63/083 399/80 |
| 2006/0123114 | A1* | 6/2006 | Aoki | H04L 69/329 709/217 |
| 2020/0053250 | A1* | 2/2020 | Iwasaki | H04N 1/444 |
| 2021/0136252 | A1* | 5/2021 | Fukuda | H04N 1/4433 |
| 2022/0201156 | A1* | 6/2022 | Togashi | H04N 1/4413 |

FOREIGN PATENT DOCUMENTS

JP        2018011183 A     1/2018

\* cited by examiner

*Primary Examiner* — Miya J Williams
(74) *Attorney, Agent, or Firm* — IP Business Solutions, LLC

(57) ABSTRACT

An information processing apparatus includes a memory and an arithmetic device. The arithmetic device acts as a registerer, a storage device, and a deleter. The registerer registers a user. The storage device stores function information related to a function to be utilized by the registered user, in the memory in association with the user. The deleter deletes, when one of a plurality of events, defined as triggers for reducing a number of the users registered by the registerer, has occurred, the registration of one or more users and the associated function information, according to a rule corresponding to the event that has occurred. The deleter keeps from deleting, when the event that has occurred, out of the plurality of events, makes the user whose registration has been deleted highly likely to be reregistered, the function information associated with the user whose registration is deleted.

9 Claims, 9 Drawing Sheets

Fig.4

| USER ID | g066f093 |
|---|---|
| PASSWORD | ******* |
| USER NAME | AAAABBB |
| DOMAIN NAME | aaa.bbb.ccc |
| DATE AND TIME OF USER REGISTRATION | 2018/2/1 10:25 |
| LATEST LOG-IN DATE AND TIME | 2020/9/1 16:04 |

Fig.5

| USER ID =g066f093 | FUNCTION | | SET VALUE |
|---|---|---|---|
| | PRINTING | SHEET SIZE | A4 |
| | | SCALING FACTOR | 100% |
| | | COLOR OR B/W | B/W |
| | | SIMPLEX OR DUPLEX | DUPLEX |
| | COPYING | SHEET SIZE | A4 |
| | | SCALING FACTOR | 100% |
| | | COLOR OR B/W | B/W |
| | | SIMPLEX OR DUPLEX | DUPLEX |
| | SCANNING | COLOR OR B/W | COLOR |
| | | RESOLUTION | 300 x 300 dpi |
| | | FILE FORMAT | PDF |
| | FACSIMILE | DOCUMENT SIZE | A4 |
| | | RESOLUTION | 200 x 100 dpi |
| | | DENSITY | MEDIUM |
| | DOCUMENT BOX | BOX NAME | XXX |
| | ID CARD COPYING | COLOR OR B/W | B/W |
| | | CONTINUOUS READING | YES |
| | | DOCUMENT SIZE | A5 |
| | | SHEET SELECTION | CASSETTE 1 |
| | | SCALING FACTOR | 100% |
| | ECOLOGICAL COPYING | COLOR OR B/W | B/W |
| | | ECOLOGICAL PRINTING | YES |
| | NEWSPAPER COPYING | COLOR OR B/W | B/W |
| | | BACK IMAGE REMOVAL | YES |
| | | GROUND COLOR ADJUSTMENT | AUTOMATIC |

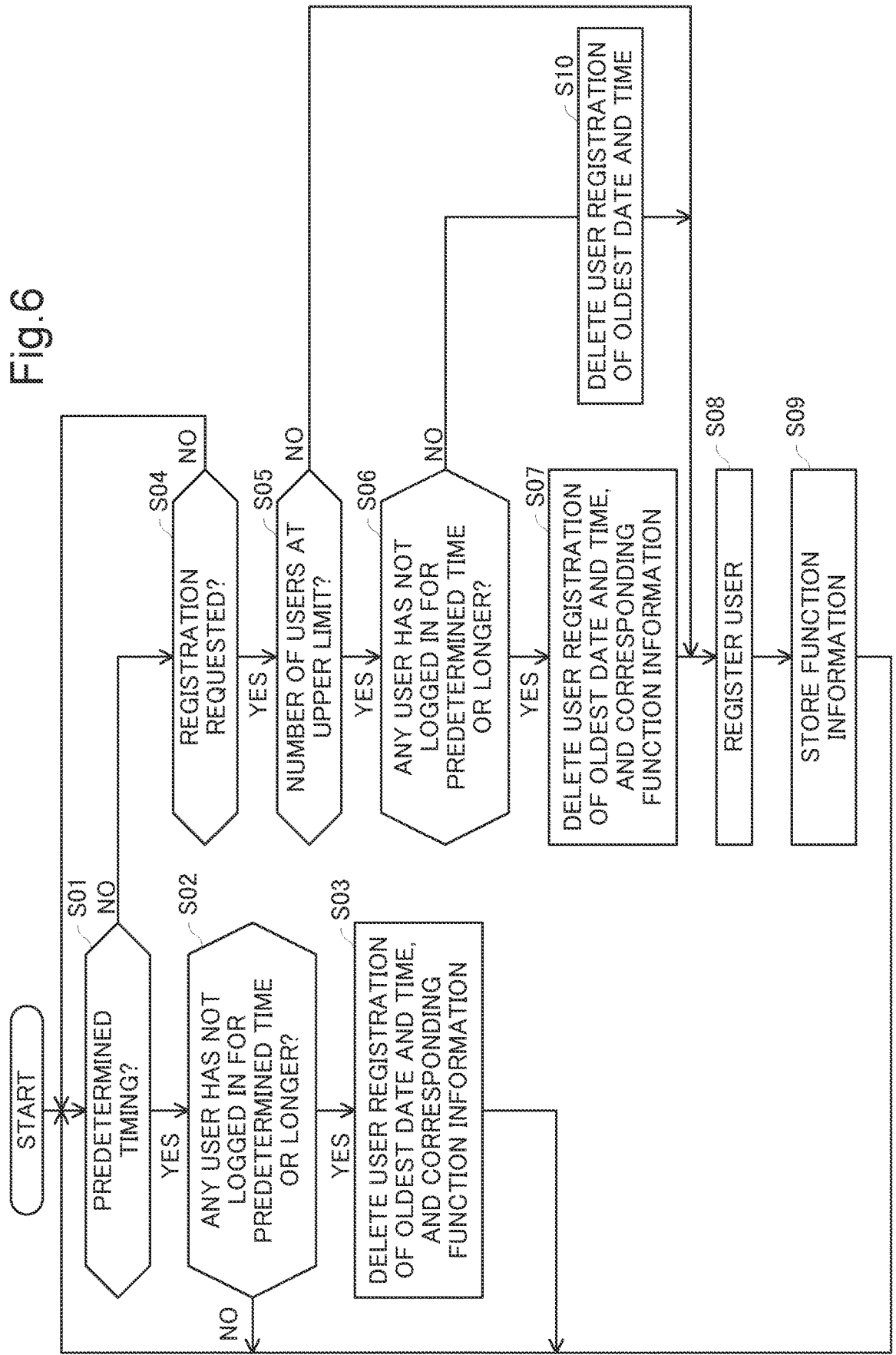

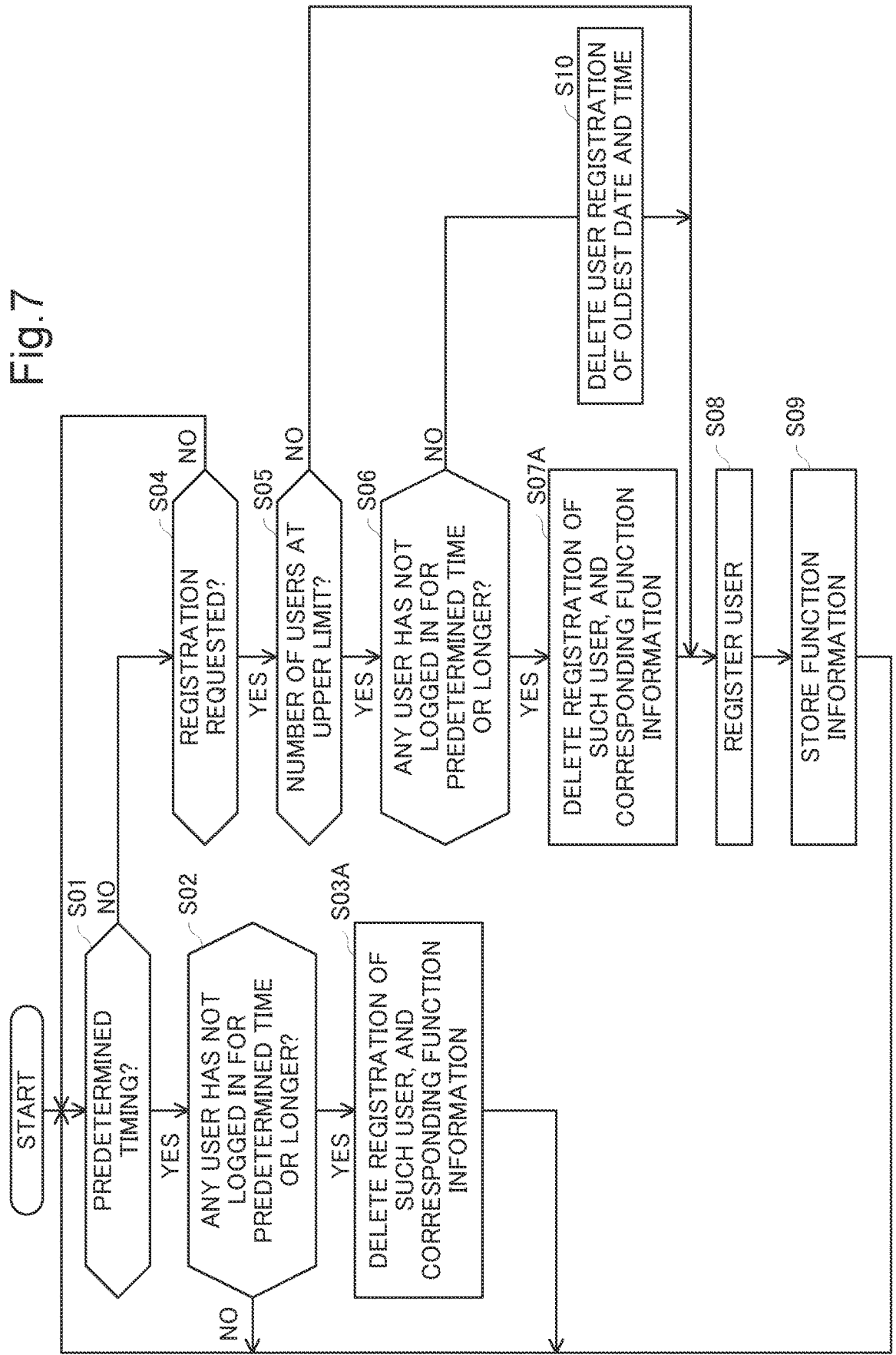

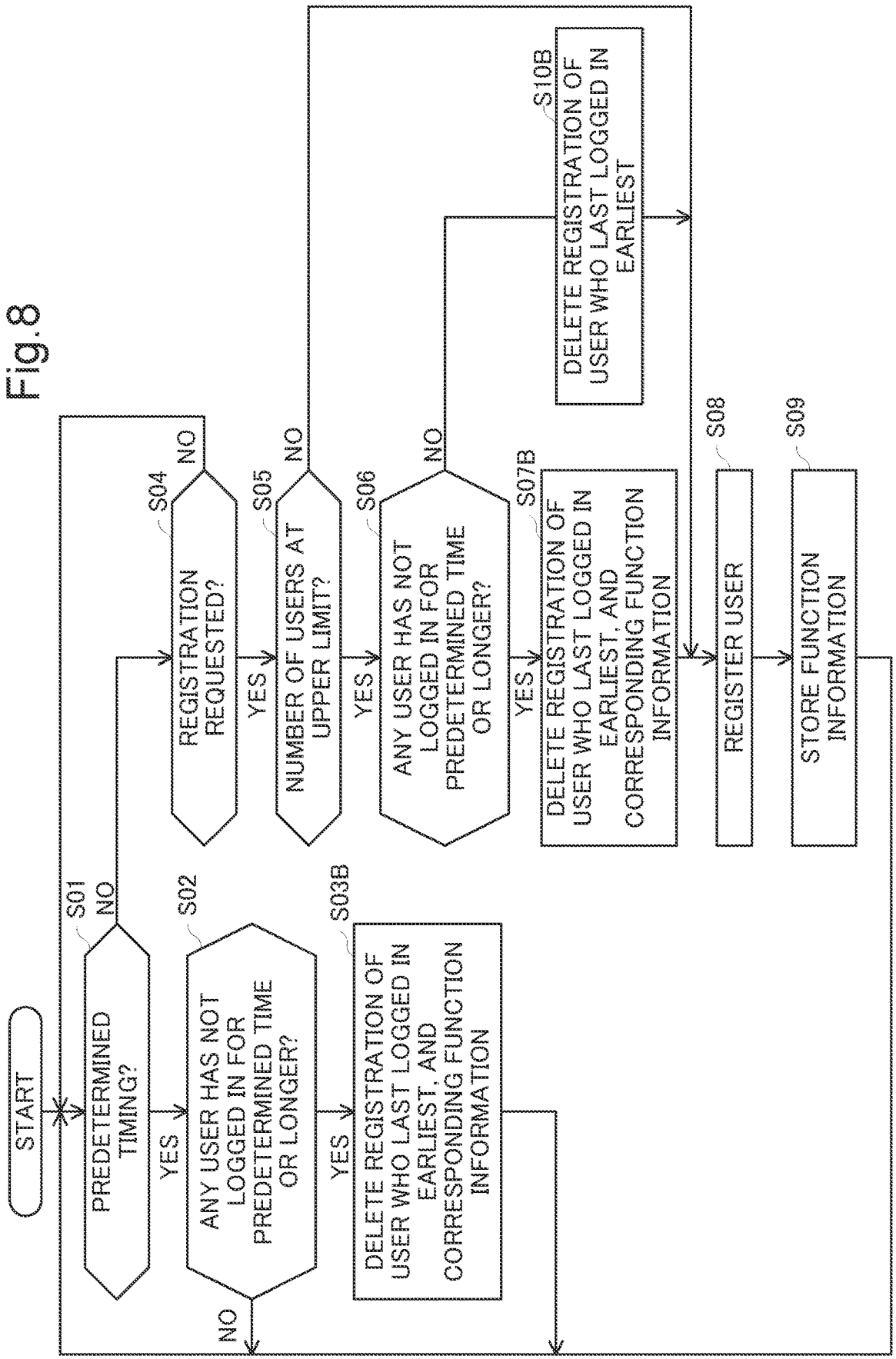

Fig.9

| USER ID =g066f093 | FUNCTION NO. | FUNCTION | AUTHORIZATION INFORMATION |
|---|---|---|---|
| | 1 | B/W PRINTING | PERMITTED |
| | 2 | COLOR PRINTING | PERMITTED |
| | 3 | COPYING | PROHIBITED |
| | 4 | SCAN/TRANSMISSION | PERMITTED |
| | 5 | FACSIMILE TRANSMISSION | PROHIBITED |

US 11,652,947 B1

INFORMATION PROCESSING APPARATUS THAT DELETES USER REGISTRATION AND FUNCTION INFORMATION, ACCORDING TO RULE RELATED TO EVENT THAT HAS OCCURRED

INCORPORATION BY REFERENCE

This application claims priority to Japanese Patent Application No. 2021-191345 filed on Nov. 25, 2021, the entire contents of which are incorporated by reference herein.

BACKGROUND

The present disclosure relates to an information processing apparatus.

Information processing apparatuses having a printing function, a copying function, a scanning function, a facsimile function, an e-mail function, and so forth are currently known. To utilize these functions, a user can specify a desired set value, instead of utilizing an initial set value specified in advance. When utilizing the printing function for example, the user can specify various sheet sizes such as A3 or B4, instead of A4 which is the initial set value of the sheet size.

In general, an information processing apparatus is shared by a plurality of users. Frequently used set values are different among the users, and therefore a user about to utilize the information processing apparatus may have to revise the initial set value, or a set value specified by another user, to a desired value. Accordingly, studies are being made to alleviate the trouble of the setting. For example, a technique has been proposed including storing the set values for each function specified by the respective users in the information processing apparatus, so that, when the user logs in in the information processing apparatus, the set value corresponding to the user who has logged in is automatically selected.

SUMMARY

The disclosure proposes further improvement of the foregoing techniques.

In an aspect, the disclosure provides an information processing apparatus including a memory, and an arithmetic device. The arithmetic device includes a processor, and acts as a registerer, a storage device, and a deleter, when the processor executes a control program. The registerer registers a user. The storage device stores function information related to a function to be utilized by the user registered by the registerer, in the memory in association with the user. The deleter deletes, when one of a plurality of events, defined as triggers for reducing a number of the users registered by the registerer, has occurred, the registration of one or more users and the associated function information, according to a rule corresponding to the event that has occurred. The deleter keeps from deleting, when the event that has occurred, out of the plurality of events, makes the user whose registration has been deleted highly likely to be reregistered, the function information associated with the user whose registration is deleted.

BRIEF DESCRIPTION OF THE DRAWINGS

FIG. 4 is a table showing registration information;

FIG. 5 is a table showing set values contained in function information;

FIG. 6 is a flowchart showing a process of account management;

FIG. 7 is a flowchart showing a process of the account management according to a first variation;

FIG. 8 is a flowchart showing a process of the account management according to a second variation; and FIG. 9 is a table showing authorization information contained in function information according to a third variation.

DETAILED DESCRIPTION

Figure 1:
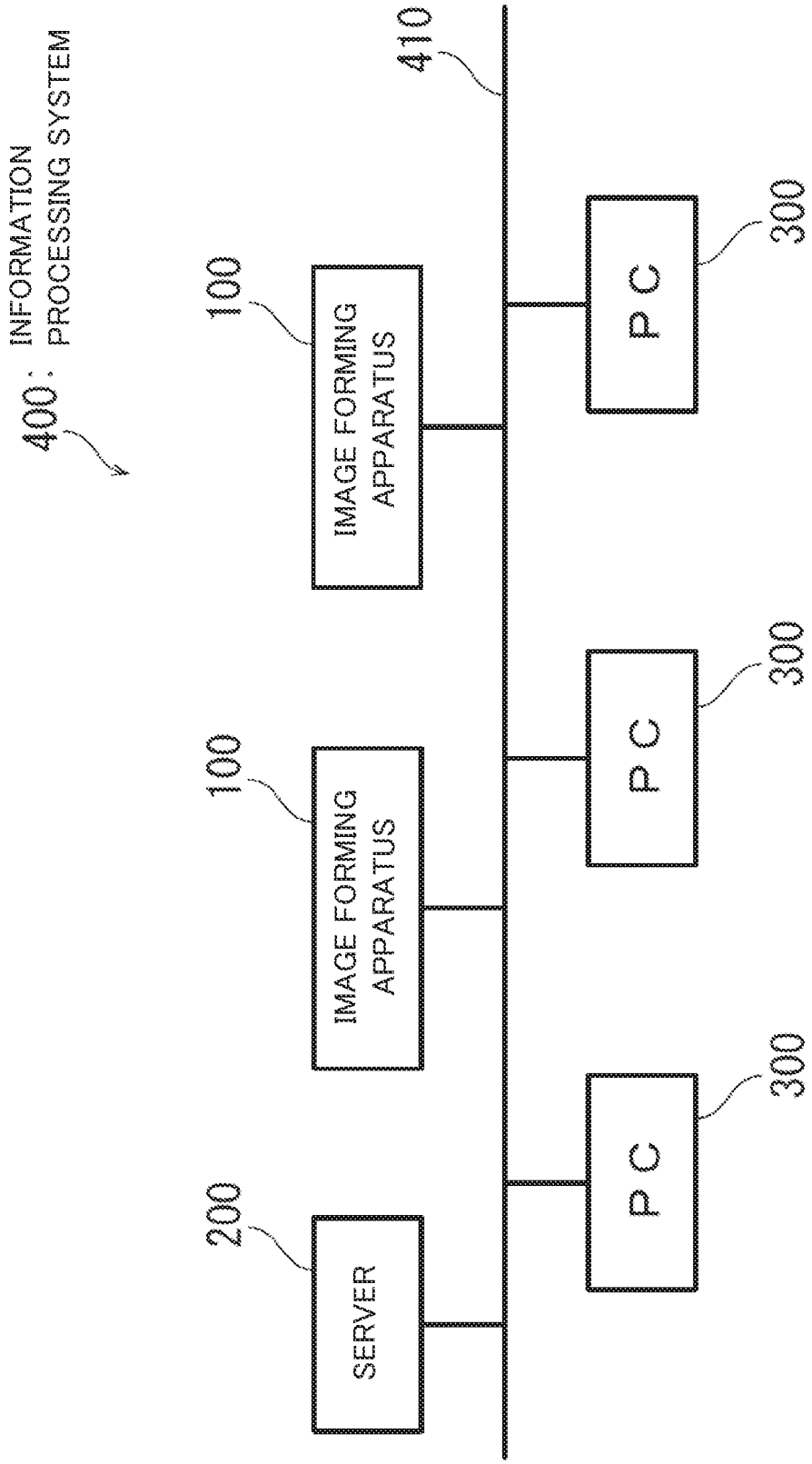
FIG. 1 is a block diagram showing a configuration of an information processing system according to an embodiment of the disclosure.

Hereafter, an information processing system 400 according to an embodiment of the disclosure will be described, with reference to the drawings. FIG. 1 is a block diagram showing a configuration of the information processing system 400 according to the embodiment of the disclosure.

First, a general configuration of the information processing system 400 will be described. As shown in FIG. 1, the information processing system 400 includes a server 200, a plurality of personal computers (PC) 300, and a plurality of image forming apparatuses 100 (exemplifying the information processing apparatus in the disclosure), connected to one another via a local area network (LAN) 410. The server 200 primarily manages information related to users of the information processing system 400. The PC 300 primarily performs document editing, and transmission of a job to the image forming apparatus 100.

Figure 2:
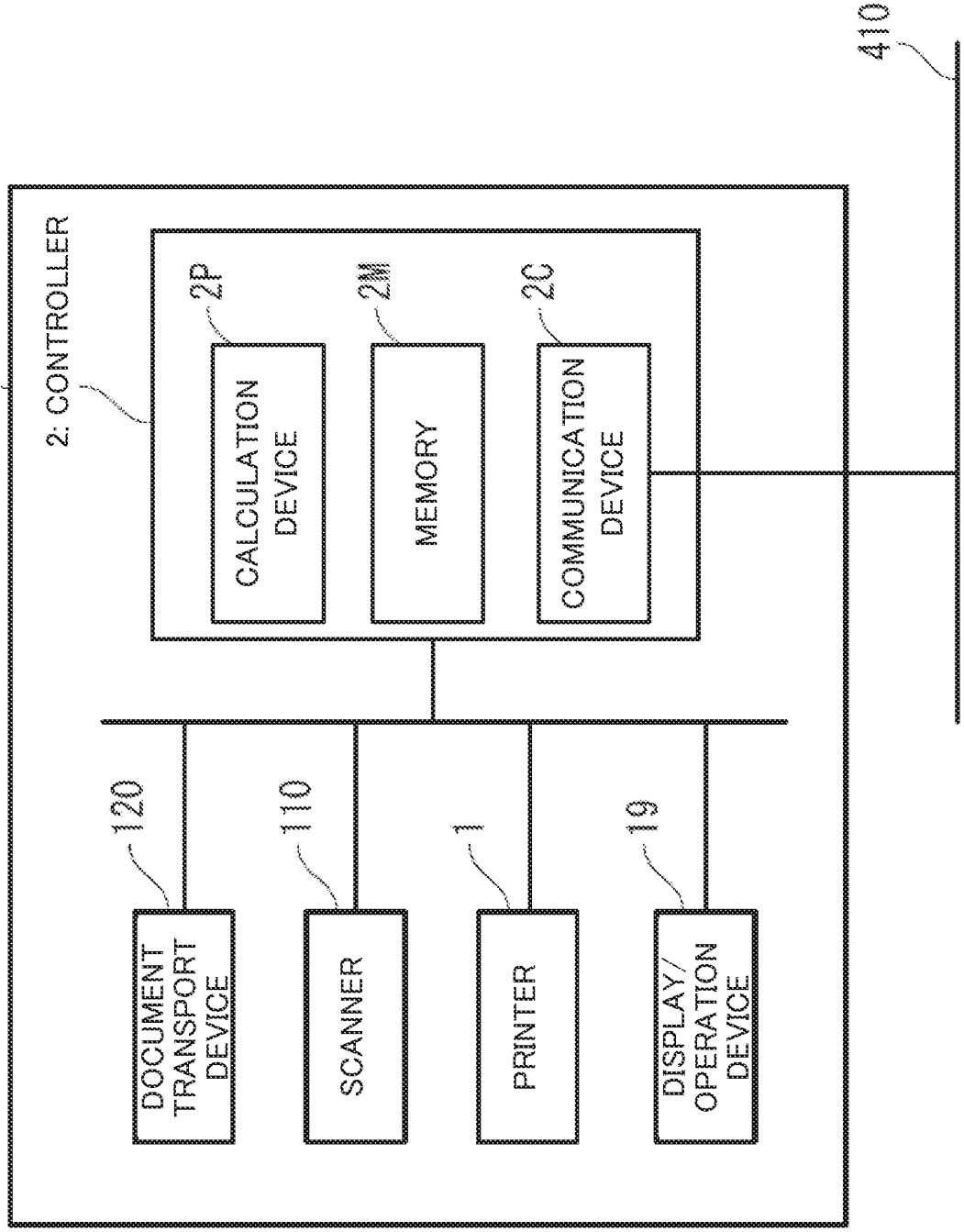
FIG. 2 is a block diagram showing a hardware configuration of an image forming apparatus.

FIG. 2 is a block diagram showing a hardware configuration of the image forming apparatus 100. The image forming apparatus 100 includes a printer 1, a scanner 110, a document transport device 120, a controller 2, and a display/operation device 19. The document transport device 120 transports a source document, along a transport route passing the reading position of the scanner 110. The scanner 110 is a flat-bed image scanner. The scanner 110 reads, for example, the image of the source document passing the reading position, and generates image data. The printer 1 forms an image based on the image data, on a sheet.

The controller 2 is referred to as a controller. The controller 2 includes an arithmetic device 2P, a memory 2M, and a communication device 2C. The arithmetic device 2P is, for example, a processor such as a central processing unit (CPU). The memory 2M includes storage media such as a read-only memory (ROM), a random-access memory (RAM), an electrically erasable programmable read-only memory (FEPROM), and a hard disk drive (HDD). The arithmetic device 2P executes various operations, by reading out an executing a control program stored in the memory 2M. The communication device 2C is a communication interface for performing communication via the LAN 410. Here, the controller 2 may be configured so as to operate solely with an integrated circuit, without utilizing software.

The display/operation device 19 includes a display panel, a touch panel overlaid on the surface of the display panel, and a keypad located adjacent to the display panel. The controller 2 displays an operation menu of the printer 1, an operation menu of the scanner 110, or the status thereof, on the display panel. The display/operation device 19 controls the components of the printer 1 or the scanner 110, according to the operation inputted through the touch panel or the keypad.

Figure 3:
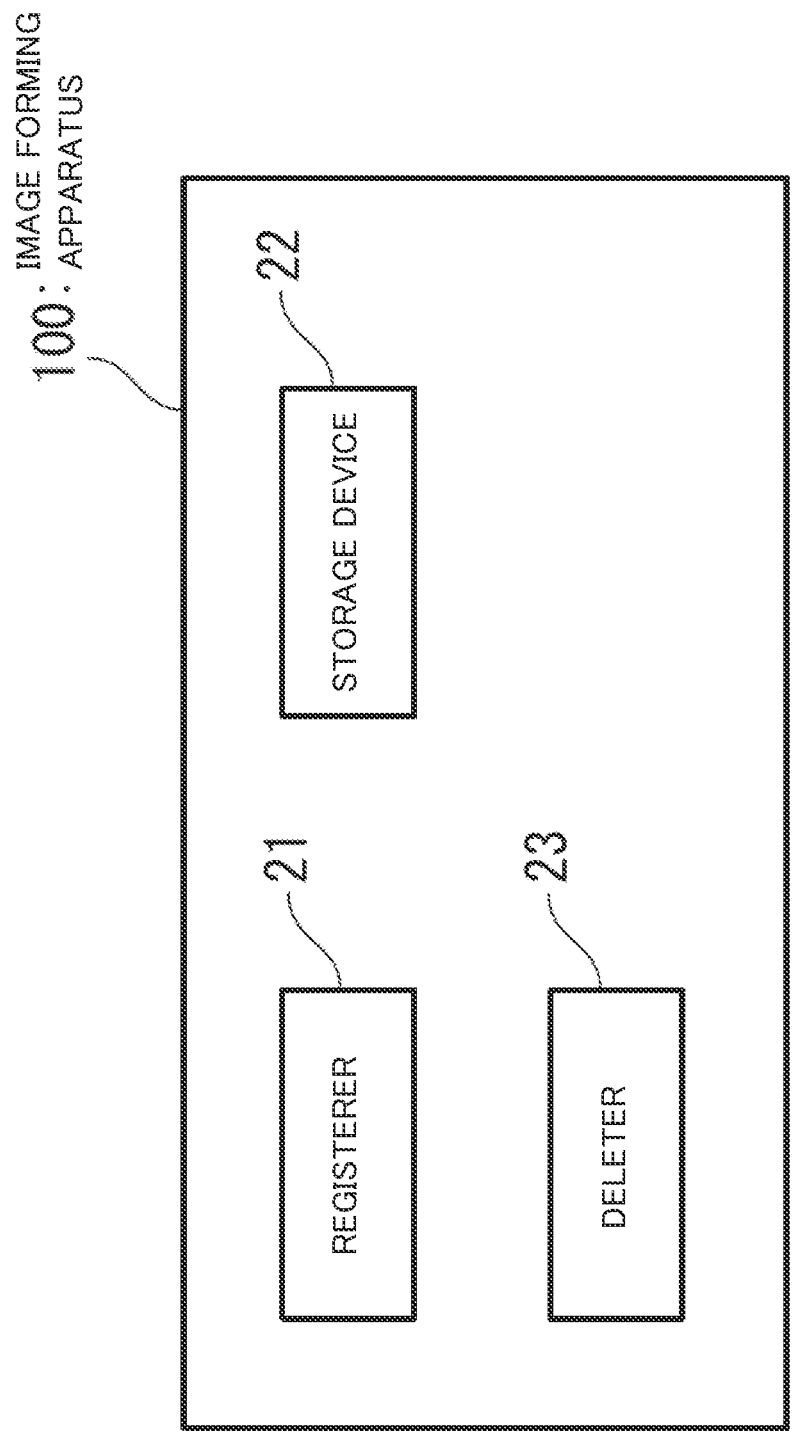
FIG. 3 is a block diagram showing a functional configuration of the image forming apparatus.

FIG. 3 is a block diagram showing a functional configuration of the image forming apparatus 100. The components cited hereunder are realized, when the arithmetic device 2P of the controller 2 reads out and executes the control program stored in the memory 2M. The arithmetic device 2P of the image forming apparatus 100 acts as a registerer 21, a storage device 22, and a deleter 23. The registerer 21 registers the user. The storage device 22 stores function information related to the function to be utilized by the user registered by the registerer 21, in the memory 2M in association with the user. The deleter 23 deletes, when one of a plurality of events, defined as triggers for reducing the number of users registered by the registerer 21, has occurred, the registration and the function information of one or more users, according to a rule corresponding to the event that has occurred. The deleter 23 keeps from deleting, when the event that has occurred, out of the plurality of events, makes the user whose registration has been deleted highly likely to be reregistered, the function information associated with the user whose registration is deleted.

[Registerer 21]

FIG. 4 illustrates a structure of registration information. To register the user, the registerer 21 stores, when the user inputs the registration information through a screen for the user registration displayed on the display/operation device 19, the inputted registration information in the memory 2M. As shown in FIG. 4, the registration information includes a user identifier (ID), a password, the user name, a domain name, date and time of user registration, and a latest log-in date and time. As already described, the information processing system 400 includes the plurality of image forming apparatuses 100. One user can be registered in the plurality of image forming apparatuses 100.

The user ID is the information for identifying the user. The password is the information only accessible by the user, or the user and the manager. When the combination of the user ID and the password, inputted by the user through the display/operation device 19, is stored in the memory 2M, the controller 2 permits the user to log in in the image forming apparatus 100. Here, the image forming apparatus 100 may be configured to reject the use by a user who has not logged in, or to allow the user who has not logged in to utilize only predetermined minimal functions. In either case, the function information (set value) to be subsequently described is applied to each of the functions of the image forming apparatus 100, when the user has logged in.

The user name is, for example, the personal name of the user, which makes it easier to identify the user than the user ID. The domain name represents a part of the uniform resource locator (URL) corresponding to the internet protocol (IP) address assigned to the PC 300. The date and time of user registration represents the date and time that the user has been registered. The latest log-in date and time represents the latest date and time that the user logged in. The latest log-in date and time is updated each time the user logs in.

The user registration may be executed by the manager administrating the information processing system 400, or by the user under the supervision of the manager. In the server 200, the user information (user ID and so forth) of the user, whose registration is permitted, is stored. The user whose registration is permitted refers, for example, to persons concerned with the organization operating the information processing system 400 (e.g., employees, or employees of subsidiary companies). When the registration information is inputted through the display/operation device 19, the controller 2 enquires the server 200 whether the user information corresponding to the inputted registration information is stored, and registers the user applying for the registration, only when the user information corresponding to the registration information is stored in the server 200.

[Memory Unit 22]

In the storage device 22, the function information about the function, to be utilized by the user registered by the registerer 21, is stored in association with the user. To be more specific, when the user registration is completed, the storage device 22 causes the display/operation device 19 to display a screen for inputting the function information, and stores the function information inputted through the screen in the memory 2M, in association with the user ID. The function information represents the set of the set values, selected in advance from the set values that can be specified for the respective functions of the image forming apparatus 100. Storing the set value likely to be frequently used, as the function information, saves the trouble of setting the value for each of the functions, after logging in. The function information may be inputted by the manager upon request of the user, or by the user under the supervision of the manager. In the case where the function information is not inputted, the storage device 22 stores a predetermined initial set value in the memory 2M.

When the user logs in in the image forming apparatus 100, the controller 2 causes the display/operation device 19 to display buttons corresponding to the respective functions, so that the user selects the function by operating the button. The controller 2 retrieves the function information corresponding to the user who has logged in, from the memory 2M, and applies the set value indicated by the function information to the selected function. Here, the user can partly revise the set value after logging in, when executing the function, or update the function information using the revised set value.

FIG. 5 illustrates the set values contained in the function information. FIG. 5 represents the respective set values for the printing function, the copying function, the scanning function, the facsimile function, a document box function, an ID card copying function, an ecological copying function, and a newspaper copying function.

For example, the set values for the printing function include the values indicating a sheet size, scaling factor, color printing or monochrome printing, and simplex printing or duplex printing. The set values for the copying function include the values indicating the sheet size, the scaling factor, color copying or monochrome copying, and simplex copying or duplex copying. The set values for the scanning function include the values indicating color reading or monochrome reading, resolution, and file format. The set values for the facsimile function include the values indicating a document size, resolution, and density. The set value for the document box function indicates a name of the box representing the storage region assigned to the user. In the document box, the image data representing the image read by the scanner 110, or document data received from the PC 300, is temporarily stored.

In each of the control programs stored in the memory 2M, various special functions for executing special processings are loaded in advance. The storage device 22 can include the set value for the special function selected by the user, in the function information. In the example shown in FIG. 5, the ID card copying, the ecological copying, and the newspaper copying are selected as the special function. The ID card copying is utilized when an ID card, such as a driver's license or an insurance card, is to be copied. When continuous reading is set in the ID card copying, the front face and the back face of the card are sequentially read, and duplex-copied on a single sheet. The ecological copying is a function to reduce the density of the copied image, to save the toner. In the ecological copying, a color image is converted into a monochrome image. The newspaper copying is a function for copying a newspaper, or a document with colored background. In the newspaper copying, the picture quality is adjusted, to make the ground color or an image on the back face invisible.

[Deleter 23]

The deleter 23 deletes, when one of a plurality of events, defined as triggers for reducing the number of users registered by the registerer 21, has occurred, the registration of one or more users and the associated function information, according to a rule related to the event that has occurred. However, the deleter does not delete, when the event that has occurred, out of the plurality of events, makes the user whose registration has been deleted highly likely to be reregistered, the function information associated with the user whose registration is deleted.

More specifically, the plurality of events include a first event that one or more of the users have not logged in, for a predetermined period of time or longer, and a second event that the user registration has been requested, when the number of users registered by the registerer 21 is at the upper limit, and there is no user who has not logged in for the predetermined period of time or longer.

In the case of the first event, the deleter 23 deletes the user registration, the date and time of registration of which is earliest, among the registration of the users who have not logged in for the predetermined period of time or longer. In the case of the second event, the deleter 23 deletes the user registration, the date and time of registration of which is earliest.

When the first event has occurred, in addition, the deleter 23 deletes the function information associated with the user whose registration has been deleted by the deleter 23. When the second event has occurred, the deleter 23 does not delete the function information associated with the user whose registration has been deleted by the deleter 23.

Hereunder, an account management executed by the controller 2 will be described. FIG. 6 is a flowchart showing the process of the account management. When power to the image forming apparatus 100 is turned on, the controller 2 executes the account management, according to the flowchart shown in FIG. 6.

First, the controller 2 decides whether a predetermined timing has been reached (step S01). The predetermined timing may be specified by the time of the day only, the day of the week and the time of the day, or the day (e.g., first Monday) and the time of the day. In other words, the controller 2 periodically performs the operation of step S01. Upon deciding that the predetermined timing has not been reached (NO at step S01), the controller 2 proceeds to step S04 to be subsequently described.

In contrast, upon deciding that the predetermined timing has been reached (YES at step S01), the controller 2 decides whether any of the users have not logged in for a predetermined period of time or longer (step S02). To be more specific, the controller 2 looks up the registration information (see FIG. 4) of all the registered users, and extracts the user who has not logged in for the predetermined period of time or longer, since the latest log-in date and time. The predetermined period of time is, for example, 30 days. When the user who has not logged in for the predetermined period of time or longer is unable to be extracted, the controller 2 decides that there is no user who has not logged in for the predetermined period of time or longer (NO at step S02), and repeats the operation of step S01.

In contrast, when the user who has not logged in for the predetermined period of time or longer is extracted, the controller 2 decides that there is a user who has not logged in for the predetermined period of time or longer (YES at step S02), and deletes the user registration, the date and time of registration of which is earliest, and the corresponding function information, among the registrations of the users who have not logged in for the predetermined period of time or longer (step S03). To be more specific, when a plurality of users are extracted at step S02, the controller 2 looks up the registration information of the extracted users, identifies the user whose date and time of registration is earliest, and deletes the registration information and the function information of the identified user, from the memory 2M. When a single user is extracted at step S02, the controller 2 deletes the registration information and the function information of the one user, from the memory 2M. After step S03, the controller 2 repeats the operation of step S01 and the subsequent steps.

At step S04, the controller 2 decides whether a request for user registration has been received through the display/operation device 19. Upon deciding that the registration request has not been received (NO at step S04), the controller 2 repeats the operation of step S01 and the subsequent steps. In contrast, upon deciding that the registration request has been received (YES at step S04), the controller 2 decides whether the number of registered users has reached the upper limit (step S05). Upon deciding that the number of registered users has not reached the upper limit (NO at step S05), the controller 2 proceeds to step S08 to be subsequently described.

In contrast, upon deciding that the number of registered users has reached the upper limit (YES at step S05), the controller 2 decides whether any of the users have not logged in for the predetermined period of time or longer (step S06). Upon deciding that one or more users have not logged in for the predetermined period of time or longer (YES at step S06), the controller 2 deletes the user registration, the date and time of registration of which is earliest, and the corresponding function information, among the registrations of the users who have not logged in for the predetermined period of time or longer (step S07), and proceeds to step S08. In contrast, upon deciding that there is no user who has not logged in for the predetermined period of time or longer (NO at step S06), the controller 2 deletes the user registration, the date and time of registration of which is earliest, and the corresponding function information (step S10), and proceeds to step S08.

At step S08, the controller 2 executes the requested user registration. More specifically, the controller 2 stores the registration information inputted through the display/operation device 19, in the memory 2M. Then the controller 2 stores the function information in the memory 2M (step S09). To be more detailed, the controller 2 causes the display/operation device 19 to display the screen for inputting the function information, and stores the function information inputted through the screen in the memory 2M, in association with the user who has been registered.

Now, limitlessly permitting many users to utilize the image forming apparatus 100 provokes troubles such as information leakage, increase in operating cost, and congestion, and therefore the number of users is limited. However, when the number of registered users reaches the upper limit, a new user registration becomes unacceptable, which also incurs inconvenience. Therefore, it is beneficial to propose a technique to reduce the number of registered users. An example of such techniques is deleting, when the number of registered users has reached the upper limit, the registration of the user who last logged in at the earliest time, or the registration of the user lowest in priority specified in advance.

Here, there is an issue that has to be settled, regarding the deletion of the user registration. When the user registration is deleted, in general, the set value associated with the user, whose registration is to be deleted, is also deleted. However, there may be cases where reregistration of the user whose registration has once been deleted is requested. In such cases, the set value has to be again specified, in addition to the operation of the reregistration, which constitutes a burden for the manager or the user.

According to the foregoing embodiment, the registerer 21 registers the user. The storage device 22 stores the function information related to the function to be utilized by the user registered by the registerer 21, in the memory 2M in association with the user. The deleter 23 deletes, when one of the plurality of events, defined as triggers for reducing the number of users registered by the registerer 21, has occurred, the registration of one or more users and the associated function information, according to the rule corresponding to the event that has occurred. The deleter 23 keeps from deleting, when the event that has occurred, out of the plurality of events, makes the user whose registration has been deleted highly likely to be reregistered, the function information associated with the user whose registration is deleted. The mentioned arrangement eliminates the need to store the function information, when the user, who is relatively more likely to be reregistered, is reregistered, thereby alleviating the burden accompanying the reregistration of the user whose registration was once deleted.

According to the foregoing embodiment, the plurality of events include the first event that one or more of the users have not logged in, for a predetermined period of time or longer, and the second event that the user registration has been requested, when the number of users registered by the registerer 21 is at the upper limit, and there is no user who has not logged in for the predetermined period of time or longer. The deleter 23 deletes the function information associated with the user whose registration is deleted by the deleter 23, when the first event has occurred, but does not delete the function information associated with the user whose registration is deleted by the deleter 23, when the second event has occurred. Although in this case the registration of the user, who has not logged in for a period shorter than the predetermined period of time, is deleted, when the second event has occurred, such user is more likely to be reregistered, compared with the user who has not logged in for the predetermined period of time or longer. Thus, the function information associated with the user who is highly likely to be reregistered remains undeleted, and therefore the trouble of inputting the set value can be saved, when such user is to be reregistered.

According to the foregoing embodiment, when the first event has occurred, the deleter 23 deletes the user registration, the date and time of registration of which is earliest, among the registrations of the users who have not logged in for the predetermined period of time or longer. With such an arrangement, the registration of the user who is less likely to utilize the information processing apparatus can be deleted, among the users who have not logged in for the predetermined period of time or longer.

According to the foregoing embodiment, the deleter 23 deletes the user registration the date and time of registration of which is earliest, when the second event has occurred. Therefore, the registration of the user, who is less likely to utilize the information processing apparatus 100, can be deleted.

According to the foregoing embodiment, the storage device 22 stores the set value selected from the set values applicable to the function, in the memory 2M as the function information. Such an arrangement saves the trouble of inputting the set value, when the user is to be reregistered.

According to the foregoing embodiment, the deleter 23 deletes, when the first event has occurred, the user registration, the date and time of registration of which is earliest, among the registrations of the users who have not logged in for the predetermined period of time or longer (see step S03 and step S07 in FIG. 6). However, the disclosure is not limited to such an arrangement. The embodiment may be modified as under.

FIG. 7 is a flowchart showing a process of the account management according to a first variation. For example, the deleter 23 may delete, when the first event has occurred, the registration of the corresponding user, in other words the user who has not logged in for the predetermined period of time or longer (see step S03A and step S07A in FIG. 7). In this case, the registration of the user, who is less likely to utilize the information processing apparatus 100, can be deleted. According to the process of FIG. 7, when a plurality of users have not logged in for the predetermined period of time or longer, the deleter 23 deletes the registration of the plurality of users.

FIG. 8 is a flowchart showing a process of the account management according to a second variation. For example, the deleter 23 may delete, when the first event has occurred, the registration of the user who last logged in at the earliest time, among the registrations of the users who have not logged in for the predetermined period of time or longer (see step S03B and step S07B in FIG. 8). With such an arrangement, the registration of the user, who is least likely to utilize the information processing apparatus 100, can be deleted, among the users who have not logged in for the predetermined period of time or longer.

According to the foregoing embodiment, the deleter 23 deletes the user registration the date and time of registration of which is earliest, when the second event has occurred (see step S10 in FIG. 6). However, the disclosure is not limited to such an arrangement. For example, the deleter 23 may delete the registration of the user who last logged in at the earliest time, when the second event has occurred (see step S10B in FIG. 8). With such an arrangement, the registration of the user, who is less likely to utilize the information processing apparatus 100, can be deleted.

The image forming apparatus 100 may further include a notifier, in addition to the configuration according to the foregoing embodiment. The notifier is for notifying the user, when the function information associated with the user, whose reregistration has been requested after the registration of this user was once deleted by the deleter 23, is stored in the storage device 22, to the effect that the function information remaining undeleted is available. For example, the controller 2 may cause the display/operation device 19, in this case serving as the notifier, to display the message to the effect that the function information remaining undeleted is available. The mentioned arrangement exempts the manager or the user from executing a useless operation, being unaware that the function information remaining undeleted is available.

Although the deleter 23 deletes the user registration the date and time of registration of which is earliest, in the foregoing embodiment, the disclosure is not limited to such an arrangement. For example, the deleter 23 may delete the registration of the user who has least frequently logged in. The deleter 23 may delete the registration of the user who has logged in the fewest number of times, for example during the last 180 days.

Although the configuration according to the disclosure is applied to the image forming apparatus 100 in the foregoing embodiment, the disclosure is applicable to an information processing apparatus other than the image forming apparatus 100 (e.g., server 200). Since the information processing system 400 includes a plurality of image forming apparatuses 100 (see FIG. 1), in this case the server 200 stores therein the registration information and the function information, in association with each of the image forming apparatuses 100, and executes the account management according to the embodiment, with respect to each of the image forming apparatuses 100.

According to the foregoing embodiment, the storage device 22 stores the set value selected in advance from the set values applicable to the function, in the memory 2M as the function information. However, the disclosure is not limited to such an arrangement. For example, the storage device 22 may store authorization information, indicating whether the function may be used, with respect to each of the functions, in the memory 2M as the function information.

FIG. 9 illustrates a structure of the authorization information contained in the function information according to a third variation. FIG. 9 shows the initial setting of the authorization information, with respect to the monochrome printing function, the color printing function, the copying function, the scan/transmission function, and the facsimile transmission function. The authorization information indicates either of "Permitted" and "Prohibited". For the authorization information, the manager inputs predetermined initial settings, depending on the assigned area or class of position of the user. However, when the user wishes to utilize the function the initial setting of which is "Prohibited", the use of the function may be permitted, upon the request from the user to the manager. In the case of the example shown in FIG. 9, the initial setting of the authorization information for the monochrome printing function, the color printing function, and the scan/transmission function is "Permitted". The initial setting of the authorization information for the copying function and the facsimile transmission function is "Prohibited".

When the user logs in in the image forming apparatus 100, the controller 2 causes the display/operation device 19 to display the buttons corresponding to the respective functions, so that the user selects the function by operating the button. The controller 2 retrieves the authorization information corresponding to the user who has logged in, from the memory 2M, and decides whether the selected function may be utilized, according to the authorization information. When the user selects the function set to "Permitted" by the authorization information, the controller 2 executes the operation corresponding to the selected function. When the user selects the function set to "Prohibited" by the authorization information, the controller 2 does not execute the operation corresponding to the selected function. Such arrangement according to the third variation alleviates the trouble of inputting the authorization information, when the user is to be reregistered.

While the present disclosure has been described in detail with reference to the embodiments thereof, it would be apparent to those skilled in the art the various changes and modifications may be made therein within the scope defined by the appended claims.

What is claimed is:

1. An information processing apparatus comprising:
a memory; and
an arithmetic device including a processor, and configured to act, when the processor executes a control program, as:
a registerer that registers a user;
a storage device that stores function information related to a function to be utilized by the user registered by the registerer, in the memory in association with the user; and
a deleter that deletes, when one of a plurality of events, defined as triggers for reducing a number of the users registered by the registerer, has occurred, the registration of one or more users and the associated function information, according to a rule corresponding to the event that has occurred,
wherein the deleter keeps from deleting, when the event that has occurred, out of the plurality of events, makes the user whose registration has been deleted highly likely to be reregistered, the function information associated with the user whose registration is deleted.

2. The information processing apparatus according to claim 1,
wherein the deleter is configured to:
delete, when a first event has occurred that one or more users have not logged in for a predetermined period of time or longer, the function information corresponding to the user whose registration has been deleted by the deleter; and
keep from deleting, when a second event has occurred that the user registration has been requested, when the number of the users registered by the registerer is at an upper limit, and there is no user who has not logged in for the predetermined period of time or longer, the function information corresponding to the user whose registration has been deleted by the deleter.

3. The information processing apparatus according to claim 2,
wherein the deleter deletes the user registration of the user who has not logged in for the predetermined period of time or longer, when the first event has occurred.

4. The information processing apparatus according to claim 3,
wherein the deleter deletes the user registration a date and time of registration of which is earliest, among the user registrations of the users who have not logged in for the predetermined period of time or longer, when the first event has occurred.

5. The information processing apparatus according to claim 3,
wherein the deleter deletes the user registration of the user who last logged in at an earliest time, among the user registrations of the users who have not logged in for the predetermined period of time or longer, when the first event has occurred.

6. The information processing apparatus according to claim 2,
wherein the deleter deletes the user registration a date and time of registration of which is earliest, when the second event has occurred.

7. The information processing apparatus according to claim 2, wherein the deleter deletes the user registration of the user who last logged in at an earliest time, when the second event has occurred.

8. The information processing apparatus according to claim 1,
wherein the storage device stores a set value selected from set values applicable to the function, in the memory as the function information.

9. The information processing apparatus according to claim 1,
wherein the storage device stores authorization information indicating whether the function may be utilized, with respect to each of the functions, in the memory as the function information.

* * * * *